(12) United States Patent
Kim

(10) Patent No.: US 11,789,485 B2
(45) Date of Patent: Oct. 17, 2023

(54) PEDAL APPARATUS FOR VEHICLE

(71) Applicant: SL Corporation, Daegu (KR)

(72) Inventor: Taejo Kim, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 17/577,481

(22) Filed: Jan. 18, 2022

(65) Prior Publication Data

US 2022/0413540 A1 Dec. 29, 2022

(30) Foreign Application Priority Data

Jun. 25, 2021 (KR) .......................... 10-2021-0082985

(51) Int. Cl.
| | |
|---|---|
| *G05G 5/03* | (2008.04) |
| *G05G 1/44* | (2008.04) |
| *G05G 5/05* | (2006.01) |
| *B60K 26/02* | (2006.01) |
| *B60T 7/04* | (2006.01) |
| *G05G 1/38* | (2008.04) |

(52) U.S. Cl.
CPC .............. *G05G 5/03* (2013.01); *G05G 1/44* (2013.01); *G05G 5/05* (2013.01); *B60K 26/021* (2013.01); *B60T 7/042* (2013.01); *G05G 1/38* (2013.01); *G05G 2505/00* (2013.01)

(58) Field of Classification Search
None
See application file for complete search history.

(56) References Cited

U.S. PATENT DOCUMENTS

| | | | |
|---|---|---|---|
| 8,434,385 B2* | 5/2013 | Mo ....................... | G05G 1/506 74/513 |
| 2011/0100153 A1* | 5/2011 | Kaijala ..................... | G05G 1/38 74/512 |
| 2013/0087009 A1* | 4/2013 | Stewart ..................... | G05G 1/44 74/560 |
| 2019/0278318 A1* | 9/2019 | Park ..................... | B60K 26/021 |

FOREIGN PATENT DOCUMENTS

| | | |
|---|---|---|
| CN | 104228573 A | 12/2014 |
| CN | 210680394 U | 6/2020 |
| JP | 2020-157787 A | 10/2020 |

* cited by examiner

*Primary Examiner* — Vicky A Johnson
(74) *Attorney, Agent, or Firm* — United One Law Group LLC; Kongsik Kim; Jhongwoo Peck

(57) ABSTRACT

A pedal apparatus for a vehicle is provided. The pedal apparatus includes a pedal arm coupled to a pedal housing such that the pedal arm is rotated with respect to a first axis by an actuating force applied to a pedal pad disposed on a distal end of the pedal arm, a pressing member for applying a force to a proximal end of the pedal arm in response to the pedal arm being rotated, a pedal reaction force generating unit disposed between the pedal arm and the pressing member to generate a pedal reaction force corresponding to the actuating force, a first friction member disposed at the pressing member to contact the proximal end of the pedal arm, and a second friction member disposed at the proximal end of the pedal arm to contact an inner surface of the pedal housing.

19 Claims, 22 Drawing Sheets

PEDAL APPARATUS FOR VEHICLE

CROSS-REFERENCE TO RELATED APPLICATION

This application claims priority to Korean Patent Application No. 10-2021-0082985 filed on Jun. 25, 2021, which is incorporated herein by reference in its entirety.

BACKGROUND

1. Technical Field

The present disclosure relates to a pedal apparatus for a vehicle, and more particularly, to a pedal apparatus for a vehicle capable of generating hysteresis when a driver operates a pedal.

2. Description of the Related Art

In general, an accelerator pedal provided in a vehicle allows accelerating the vehicle by adjusting the amount of air aspirated into the engine or the amount of fuel injected into the engine based on the angle at which the pedal is rotated by the force of a driver pressing the pedal.

Accelerator pedals include a pendant type installed on the dash panel and an organ type installed on the floor panel depending on the mounting structure, and are divided into a mechanical type and an electronic type depending on the operation method.

Some accelerator pedals generate hysteresis to reduce the fatigue felt when the driver operates the pedal by differentiating the amount of force applied to the driver's foot when the driver steps on the pedal and when the driver takes off his/her foot from the pedal. In general, hysteresis is generated by a device that operates to generate friction in conjunction with the pedal when the pedal is rotated.

However, if a device for generating hysteresis when the driver operates the pedal is separately provided, the number of parts increases, the configuration becomes complicated, and the cost is likely to increase. Therefore, a method for effectively generating hysteresis while reducing the number of parts is required.

SUMMARY

The present disclosure has been devised to solve the above problems, and the technical object of the present disclosure is to provide a pedal apparatus that generates different magnitudes of pedal reaction forces when the driver steps on the pedal and when the driver releases the pedal.

Objects of the present disclosure are not limited to those mentioned above, and other objects not mentioned will be clearly understood by those skilled in the art from the following description.

According to an aspect of the present disclosure, a pedal apparatus for vehicle may include a pedal arm coupled to a pedal housing such that the pedal arm is rotatable with respect to a first axis by an actuating force applied to a pedal pad disposed at a distal end of the pedal arm; a pressing member for applying a force to a proximal end of the pedal arm in response to the pedal arm being rotated; a pedal reaction force generating unit disposed between the pedal arm and the pressing member to generate a pedal reaction force corresponding to the actuating force; a first friction member disposed at the pressing member to contact the proximal end of the pedal arm; and a second friction member disposed at the proximal end of the pedal arm to contact an inner surface of the pedal housing.

The pressing member may be disposed to be spaced apart from the second friction member. The pressing member may be installed in the pedal housing to be rotatable with respect to a second axis. The second axis may be disposed parallel to the first axis.

The first friction member and the second friction member may be disposed to face each other with respect to the first axis.

Further, a contact surface of the first friction member in contact with the proximal end of the pedal arm may have a shape corresponding to a shape of the proximal end of the pedal arm, and the contact surface of the first friction member may have a curved shape having a predetermined radius with respect to the first axis.

One of the pressing member or the first friction member may include at least one mounting protrusion, and the other of the two may include at least one mounting groove, into which the at least one mounting protrusion is inserted.

A contact surface of the second friction member in contact with the inner surface of the pedal housing may have a shape corresponding to the inner surface of the pedal housing, and the inner surface of the pedal housing may have a curved shape having a predetermined radius with respect to the first axis.

Further, the pressing member may be accommodated in the pedal housing through an opening formed in the pedal housing, and a cover may be coupled to the pedal housing to shield the opening with the pressing member accommodated therein. The cover may include at least one coupling protrusion that is inserted into and coupled to at least one coupling groove formed near the opening. The cover may further comprise a guide unit formed to surround an outer surface of the pedal housing so that a coupling position of the cover may be aligned.

A force applied to the pedal housing by the second friction member may increase as a force applied to the proximal end of the pedal arm by the first friction member increases. A frictional force generated between the first friction member and the proximal end of the pedal arm may have a magnitude corresponding to a normal force generated from the proximal end of the pedal arm according to a force applied to the proximal end of the pedal arm by the first friction member. Further, a magnitude of the frictional force generated between the first friction member and the proximal end of the pedal arm may vary depending on a magnitude of the actuating force transmitted through the pressing member.

A frictional force generated between the second friction member and the pedal housing may have a magnitude corresponding to a normal force generated from the inner surface of the pedal housing according to a force applied to the inner surface of the pedal housing by the second friction member. A magnitude of the frictional force generated between the second friction member and the pedal housing may vary depending on a magnitude of a force applied to the proximal end of the pedal arm by the first friction member.

In particular, in response to a driver depressing the pedal pad, the frictional force generated between the first friction member and the proximal end of the pedal arm and the frictional force generated between the second friction member and the pedal housing may act in a first direction opposite to a direction of the actuating force acting on the pedal arm. In response to the driver releasing the pedal pad, the frictional force generated between the first friction member and the proximal end of the pedal arm and the frictional force generated between the second friction member and the pedal housing may act in a second direction opposite to the first direction.

According to the pedal apparatus for a vehicle of the present disclosure as described above, one or more of the following effects may be provided. When the driver operates the pedal, different magnitudes of frictional force may be generated depending on the magnitude of the actuating force applied to the pedal, and the frictional force acts in different directions to generate hysteresis when the driver steps on (e.g., depresses) the pedal and when the driver takes off (e.g., releases) his/her foot from the pedal. Accordingly, fatigue may be reduced when the driver operates the pedal.

The effects of the present disclosure are not limited to those mentioned above, and other effects not mentioned will be clearly understood by those skilled in the art from the description of the claims.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
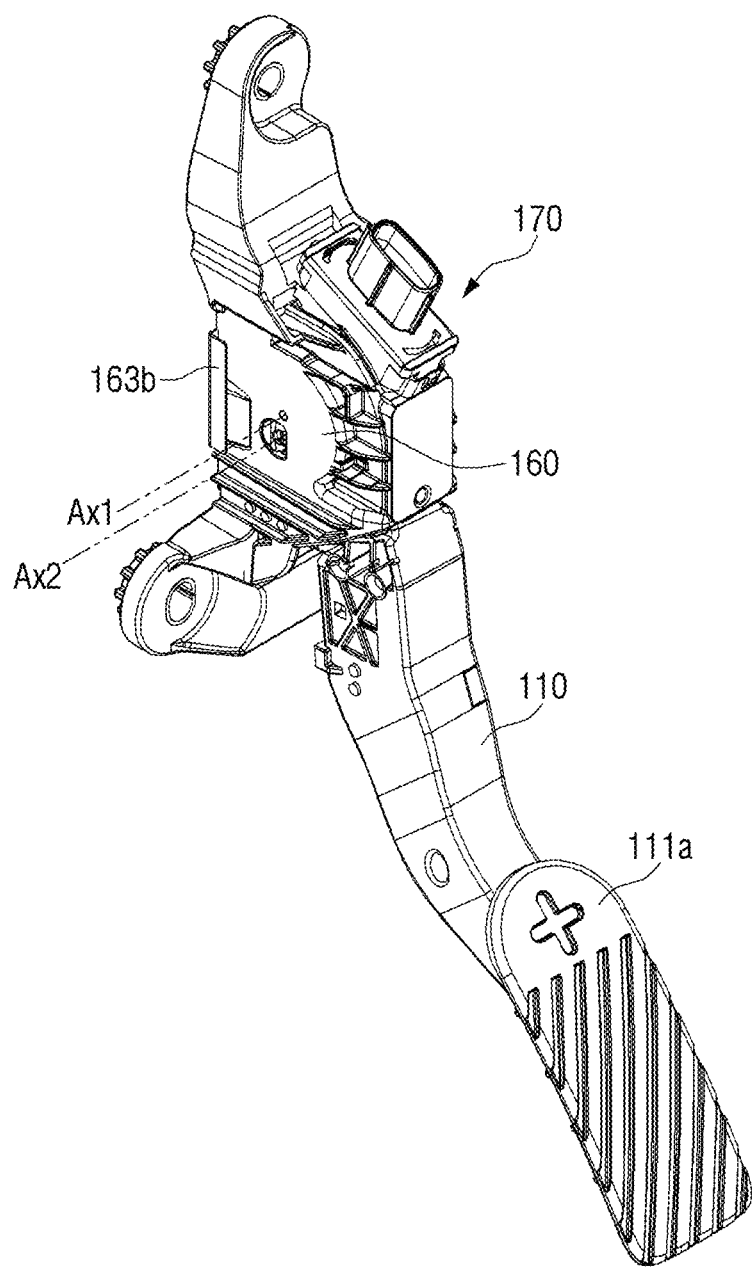
FIG. 1 is a perspective view showing a pedal apparatus for a vehicle according to an exemplary embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Like reference numerals refer to like elements throughout the specification.

Therefore, in some exemplary embodiments, well-known processes, well-known structures and well-known technologies will not be specifically described in order to avoid ambiguous interpretation of the present disclosure.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated component, steps, operations, and/or elements, but do not preclude the presence or addition of one or more other components, steps, operations, elements, and/or groups thereof. As used herein, the term "and/or" includes any and all combinations of one or more of the associated listed items.

Exemplary embodiments of the disclosure are described herein with reference to cross-section and/or schematic illustrations that are illustrations of idealized exemplary embodiments. As such, variations from the shapes of the illustrations as a result, for example, of manufacturing techniques and/or tolerances, are to be expected. Thus, exemplary embodiments should not be construed as limited to the particular shapes illustrated herein but are to include deviations in shapes that result, for example, from manufacturing. In addition, each element illustrated in figures of the present disclosure may have been enlarged or reduced for ease of description. Throughout the specification, like reference numerals in the drawings denote like elements.

Hereinafter, the present disclosure will be described with reference to the drawings for describing a pedal apparatus for a vehicle according to exemplary embodiments of the present disclosure.

Figure 2:
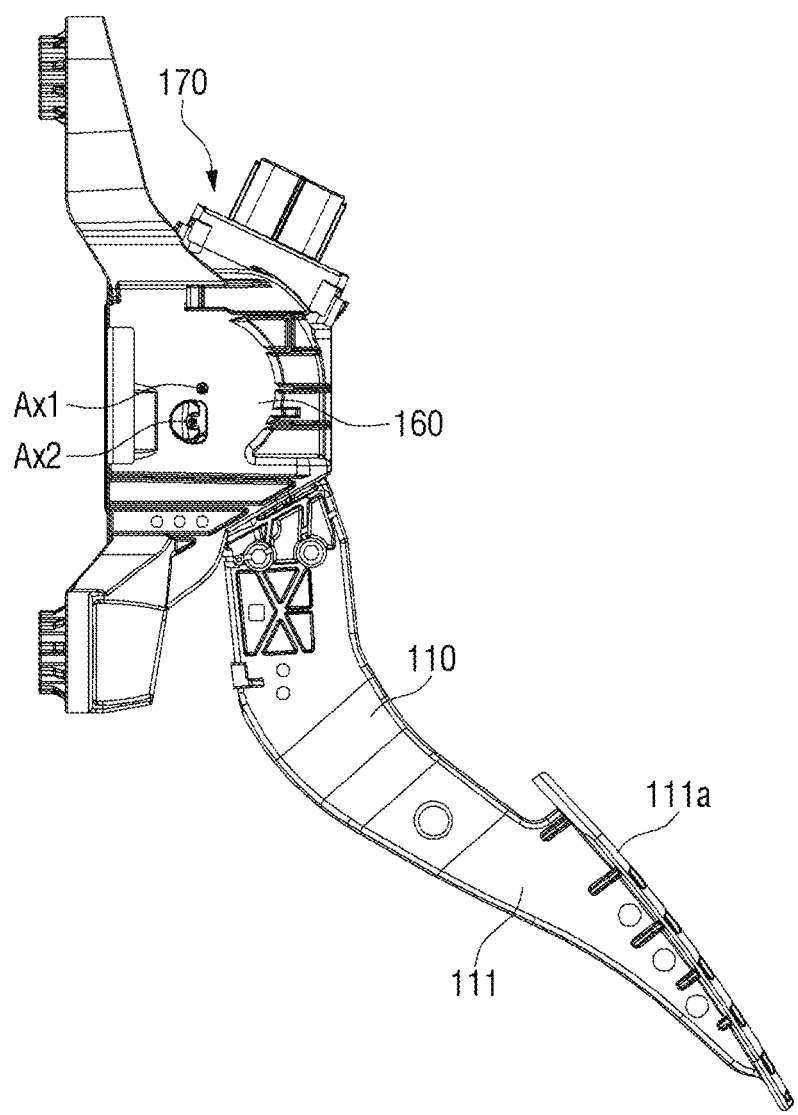
FIG. 2 is a side view showing a pedal apparatus for a vehicle according to an exemplary embodiment of the present disclosure.
Figure 3:
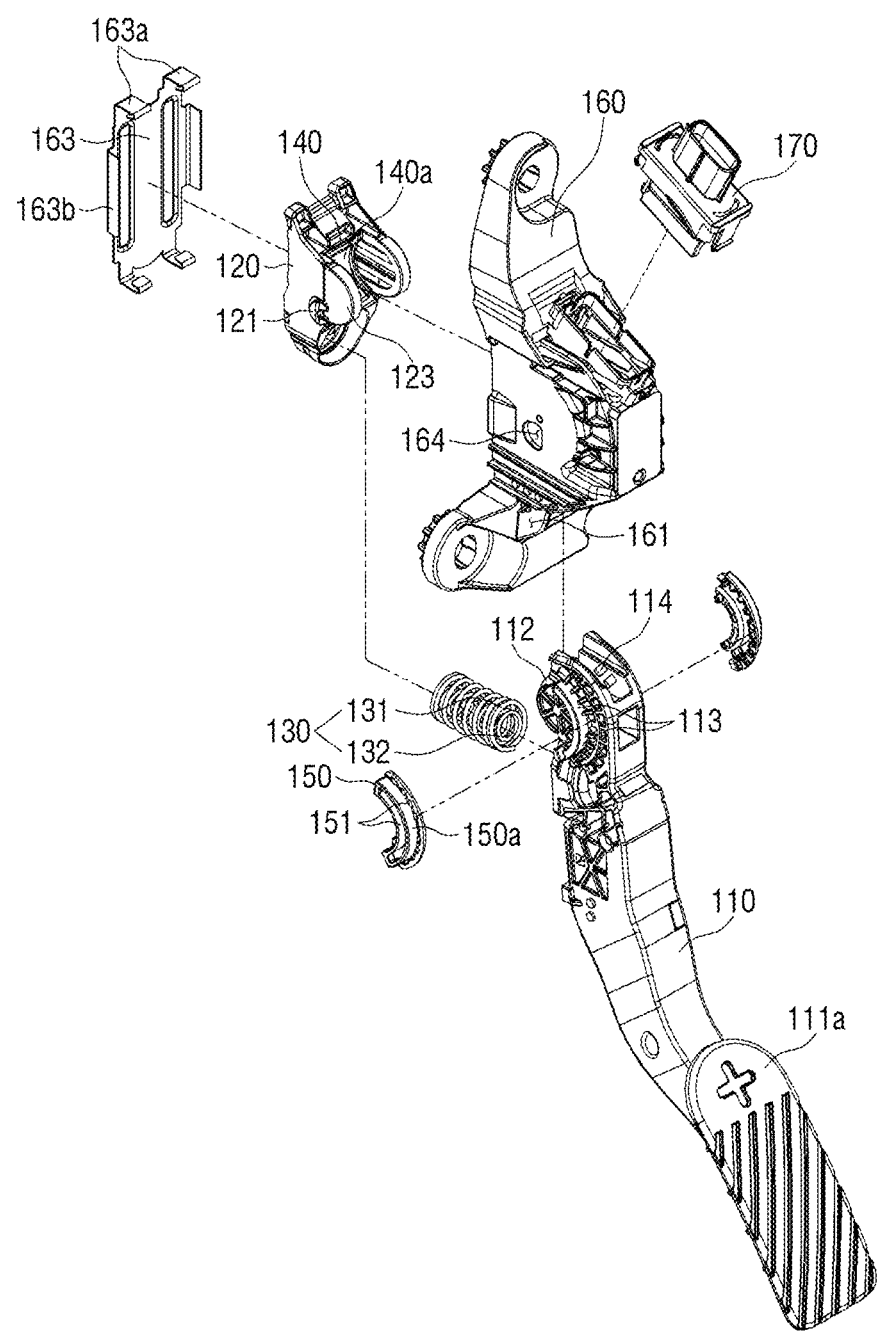
FIGS. 3 and 4 are exploded perspective views showing a pedal apparatus for a vehicle according to an exemplary embodiment of the present disclosure.
Figure 4:
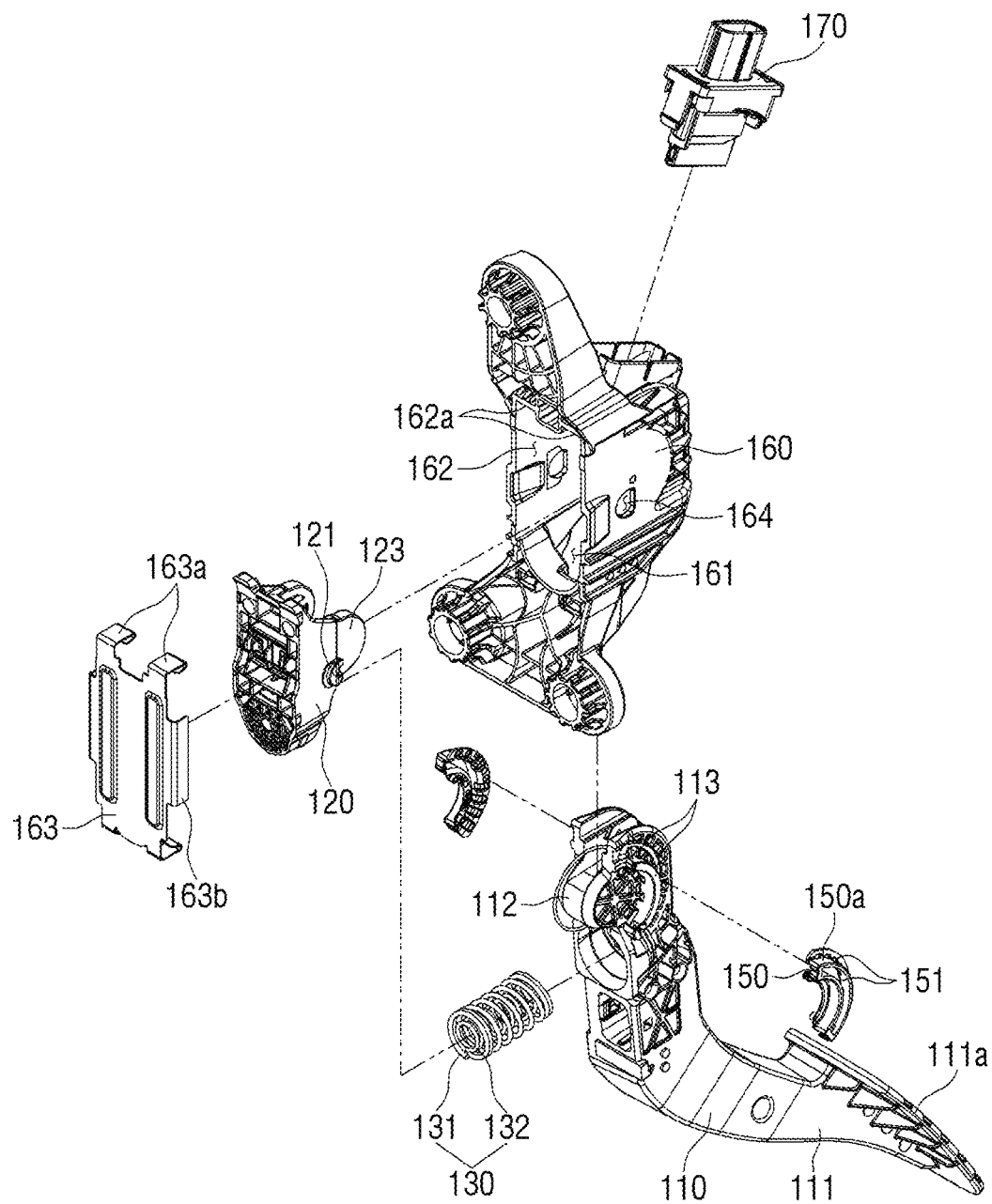

FIG. 1 is a perspective view showing a pedal apparatus for a vehicle according to an exemplary embodiment of the present disclosure, FIG. 2 is a side view showing a pedal apparatus for a vehicle according to an exemplary embodiment of the present disclosure, and FIGS. 3 and 4 are an exploded perspective view showing a pedal apparatus for a vehicle according to the present disclosure.

Referring to FIGS. 1 to 4, the pedal apparatus 100 for a vehicle according to an exemplary embodiment of the present disclosure may include a pedal arm 110, a pressing member 120, a pedal reaction force generating unit 130, a first friction member 140, and a second friction member 150. In the present disclosure, the pedal apparatus 100 for a vehicle is described with regard to an example of a pendant type that is installed by hanging it to a dash panel and used for vehicle acceleration, but the present disclosure is not limited thereto. The vehicle pedal apparatus 100 may be used for deceleration of a vehicle (e.g., as a brake pedal), and may be similarly applied to an organ type installed on a floor panel of a vehicle.

The pedal arm 110 may be coupled to the pedal housing 160 to be rotatable with respect to a first axis Ax1, and the pedal arm 110 may include a pedal pad 111a to allow the driver to apply an actuating force for rotating the pedal arm 110. When the driver depresses or releases the pedal pad 111a, the pedal arm 110 may be rotated with respect to the first axis Ax1.

In the exemplary embodiment of the present disclosure, since the case where the vehicle pedal apparatus 100 is a pendant type is described as an example, the pedal pad 111a may be formed at a distal end 111 of the pedal arm 110 close to the floor panel of the vehicle. Further, a proximal end 112 of the pedal arm 110, which may be accommodated in the pedal housing 160, may be rotated with respect to the first axis Ax1 when the driver depresses or releases the pedal pad 111a. Herein, the term "release" or its variations may mean easing the stepping force on the pedal pad 111a, for example, by moving the foot in a direction opposite to the depressing direction with or without actually taking the foot off the pedal pad 111a, such that the pedal arm 110 may be allowed to return toward its undepressed position.

According to the exemplary embodiment of the present disclosure, the pedal pad 111a may be manufactured integrally with the pedal arm 110. However, the present disclosure is not limited thereto, and the pedal pad 111a may be manufactured separately from the pedal arm 110 and may be subsequently combined with each other.

The pressing member 120 may apply a force to one side of the proximal end 112 of the pedal arm 110 in response to an actuating force applied to the pedal arm 110 when the driver depresses the pedal pad 111a, and the pressing member 120 may generate hysteresis of pedal reaction forces. In other words, the pressing member 120 may generate different magnitudes of the pedal reaction forces when the driver depresses the pedal pad 111a and when the driver releases the pedal pad 111a. Detailed description thereof will be described later below.

The pressing member 120 may be accommodated in the pedal housing 160 through the second opening 162 formed in the pedal housing 160. When the pressing member 120 is accommodated in the pedal housing 160, the cover 163 may be coupled to the pedal housing 160 so that the second opening 162 is shielded, and the pressing member 120 may be prevented from being separated from the pedal housing 160.

In the exemplary embodiment of the present disclosure, although it will be illustratively described that the cover 163 has a coupling protrusion 163a that is inserted into the coupling groove 162a formed near the second opening 162 and is coupled to the pedal housing 160, but the present disclosure is not limited thereto. The cover 163 may be coupled to the pedal housing 160 such that the second opening 162 is shielded via various methods such as hook coupling, screw coupling, fitting coupling, adhesive, etc.

In addition, the cover 163 may include a guide unit 163b formed to surround the outer surface of the pedal housing 160, and the guide unit 163b may serve to ensure that the coupling position is aligned when the cover 163 is coupled to the pedal housing 160.

The pressing member 120 may be installed on the pedal housing 160 to be rotatable with respect to the second axis Ax2, which is offset from the first axis Ax1. The description that the pressing member 120 may be installed to be rotatable with respect to the second axis Ax2 may be understood to include cases where the pressing member 120 cannot actually rotate with respect to the second axis Ax2 due to the surrounding structure, but the rotation is possible with respect to the second axis Ax2 if the surrounding structure is removed, as well as where the pressing member 120 is actually rotated with respect to the second axis Ax2. The pressing member 120 may have an insertion protrusion 121 that is inserted into the insertion groove 164 formed in the pedal housing 160, and as the insertion protrusion 121 is inserted into the insertion groove 164 with the second axis Ax2 as the center, the pressing member 120 may be coupled to the pedal housing 160.

The pedal reaction force generating unit 130 may be disposed between the pedal arm 110 and the pressing member 120 to generate a pedal reaction force in reaction to an actuating force applied to the pedal arm 110. For example, when the driver depresses the pedal pad 111a, exerting a pedal actuation force, the pedal reaction force generating unit 130 may generate a pedal reaction force in a direction opposite to the direction of the pedal actuation force. As such, if the pedal reaction force is greater than the pedal actuation force, the pedal arm 110 may be subject to a torque that tend to return the pedal arm 110 toward its undepressed position. If the pedal reaction force is less than the pedal actuation force, the pedal arm 110 may be subject to a torque that tend to move the pedal arm 110 toward the depressed position.

In the exemplary embodiment of the present disclosure, the pedal reaction force generating unit 130 may include at least one elastic member 131 and 132 and may be compressed when the driver depresses the pedal pad 111a, and the pedal reaction force corresponding to the restoring force generated thereby may act in a direction opposite to the direction in which the driver depresses the pedal pad 111a.

In the exemplary embodiment of the present disclosure, although a coil spring is used as an example for the at least one elastic member 131 and 132, the present disclosure is not limited thereto. Various types of springs that can be compressed and generate restoring force when the driver steps on the pedal pad 111a can be used as the pedal reaction force generating unit 130.

The pedal reaction force generating unit 130 may be disposed so that both ends thereof are supported by facing surfaces of the pedal arm 110 and the pressing member 120, respectively. Due to this configuration, when the driver depresses the pedal pad 111a, as the surface of the pedal arm 110 facing the surface of the pressing member 120 approaches the pressing member 120, the pedal reaction force generating unit 130 may be compressed to generate a pedal reaction force corresponding to the restoring force.

Figure 5:
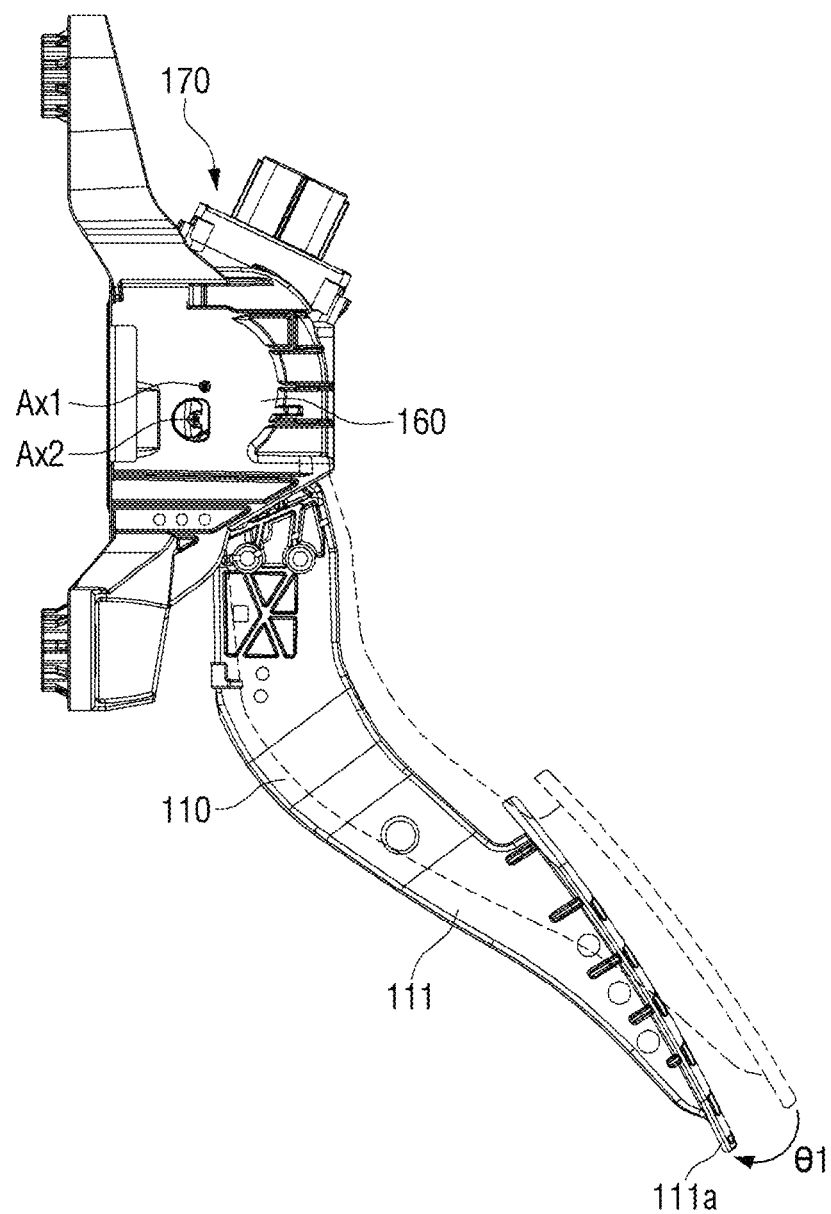
FIG. 5 is a side view of the pedal arm rotated to a first angle in accordance with an exemplary embodiment of the present disclosure.
Figure 6:
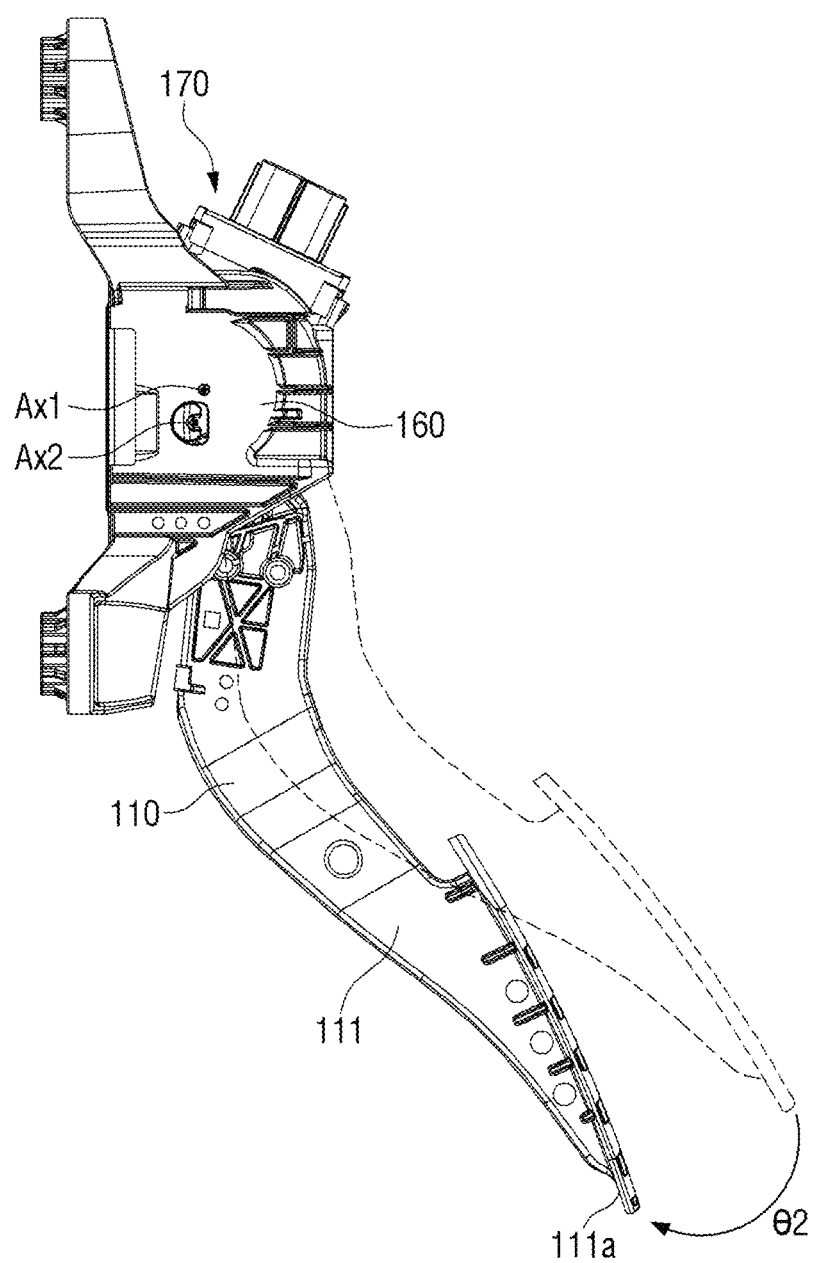
FIG. 6 is a side view of the pedal arm rotated to a second angle in accordance with an exemplary embodiment of the present disclosure.

Further, as the angle, by which the pedal arm 110 is rotated by the driver depressing the pedal pad 111a, increases, the degree of compression increases and the restoring force increases, so that the larger the rotation angle of the pedal arm 110 becomes, the larger the generated pedal reaction force becomes. Referring to FIGS. 5 and 6, when the degrees of compression of the pedal reaction force generating unit 130 are different due to the different rotation angles θ1 and θ2 of the pedal arm 110, the magnitudes of the pedal reaction force generated by the pedal reaction force generating unit 130 may also be different. In other words, compared to when the pedal arm 110 is rotated at a first angle θ1 with respect to the position of the pedal arm 110 that corresponds to the position when the driver does not depress the pedal pad 111a (i.e., "undepressed position"), as shown in FIG. 5, when the pedal arm 110 is rotated at a second angle θ2 greater than the first angle θ1 as shown in FIG. 6, the degree of compression of the pedal reaction force generating unit 130 may be increased, so that a greater pedal reaction force can be generated.

Figure 7:
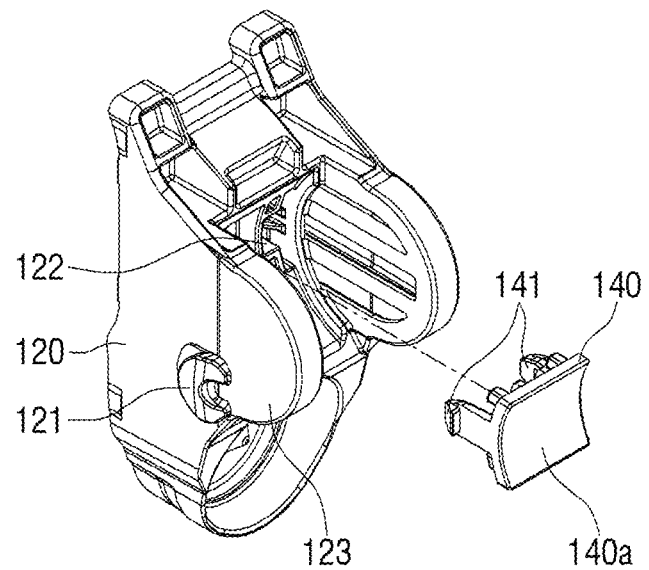
FIG. 7 is an exploded perspective view showing a pressing member according to an exemplary embodiment of the present disclosure.
Figure 8:
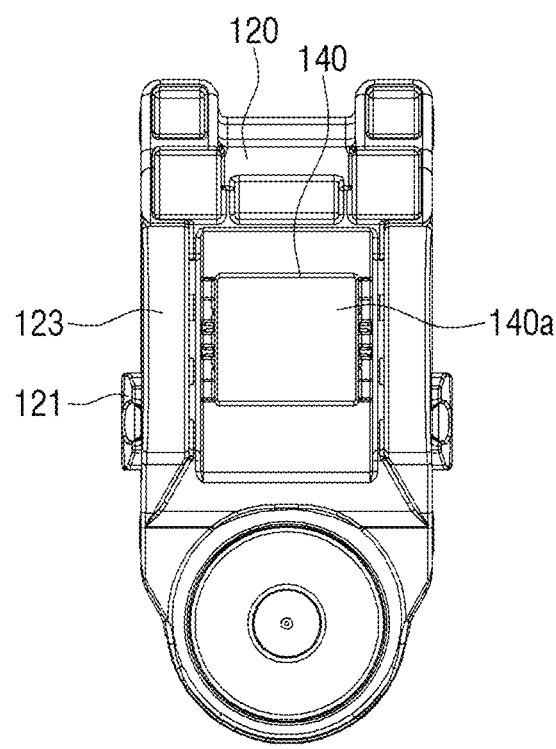
FIG. 8 is a front view showing a pressing member according to an exemplary embodiment of the present disclosure.
Figure 9:
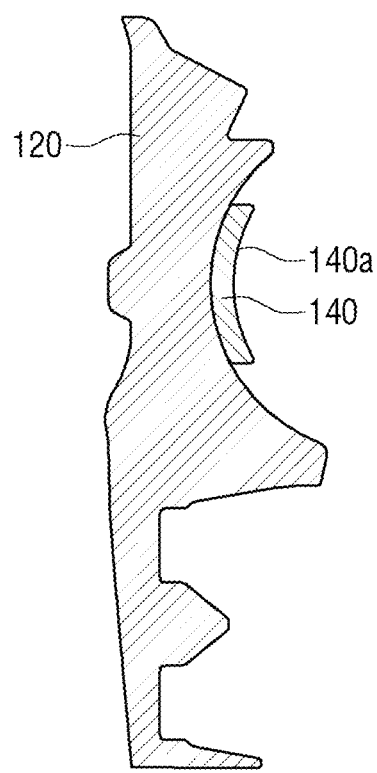
FIG. 9 is a cross-sectional view showing a pressing member according to an exemplary embodiment of the present disclosure.
Figure 10:
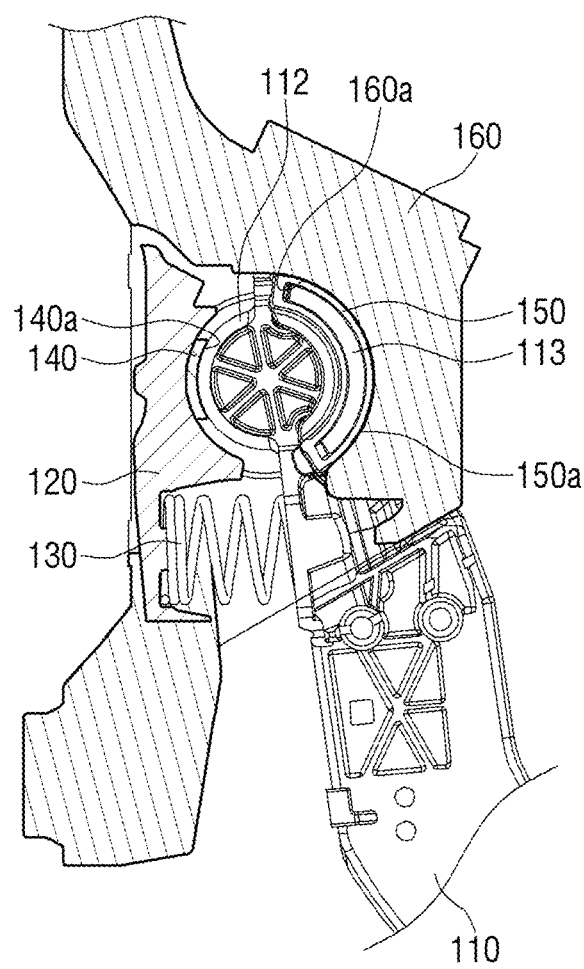
FIG. 10 is a cross-sectional view illustrating a pedal apparatus for a vehicle according to an exemplary embodiment of the present disclosure.

FIG. 7 is an exploded perspective view showing the pressing member 120 according to an exemplary embodiment of the present disclosure, FIG. 8 is a front view showing the pressing member 120 according to an exemplary embodiment of the present disclosure, FIG. 9 is a cross-sectional view illustrating the pressing member 120 according to an exemplary embodiment of the present disclosure, and FIG. 10 is a cross-sectional view illustrating a pedal apparatus for a vehicle according to an exemplary embodiment of the present disclosure.

Referring to FIGS. 7 to 10, a first friction member 140 that is in contact with one side of the proximal end 112 of the pedal arm 110 may be coupled to the pressing member 120 according to the exemplary embodiment of the present disclosure. At least one mounting protrusion 141 may be formed in the first friction member 140, and at least one mounting groove 122, into which the at least one mounting protrusion 141 is inserted, may be formed in the pressing member 120 so that the first friction member 140 may be mounted on the pressing member 120. However, the present disclosure is not limited thereto, and the mounting protrusion may be formed in one of the first friction member 140 or the pressing member 120 and the corresponding mounting groove may be formed in the other of the first friction member 140 or the pressing member 120. In addition, the first friction member 140 may be mounted on the pressing member 120 in various other ways such as hook coupling, screw coupling, fitting coupling, etc. as well as via the mounting protrusion 141 and the mounting groove 122 described above.

When an actuating force is applied to the pedal arm 110, the first friction member 140 may generate a first frictional force between one side of the proximal end 112 of the pedal arm 110 and the first friction member 140 by applying a force to one side of the proximal end 112 of the pedal arm 110 according to the actuating force transmitted through the pedal reaction force generating unit 130 and the pressing member 120.

Accordingly, a contact surface 140a with which the first friction member 140 contacts one side of the proximal end 112 of the pedal arm 110, may have a shape corresponding to one side of the proximal end 112 of the pedal arm 110. In the exemplary embodiment of the present disclosure, an example where the contact surface 140a of the first friction member 140 has a curved shape having a predetermined radius with respect to the first axis Ax1 will be described. This configuration may enable the rotation of the pedal arm 110 and may allow a first frictional force to be generated between the first friction member 140 and one side of the proximal end 112 of the pedal arm 110.

More specifically, while the pressing member 120 may be installed in the pedal housing 160 to be rotatable with respect to the second axis Ax2, when the first friction member 140 abuts one side of the proximal end 112 of the pedal arm 110, the pressing member 120 may no longer be rotated. In this state, when the rotation angle of the pedal arm 110 is further increased to cause the pedal reaction force generating unit 130 to be compressed more, since the force applied to one side of the proximal end 112 of the pedal arm 110 by the first friction member 140 increases, the normal force exerted on one side of the proximal end 112 of the pedal arm 110 increases. As a result, the magnitude of the first frictional force increases.

At this time, when the driver depresses the pedal pad 111a, the first frictional force acts in a first direction opposite to the direction of the actuating force acting on the pedal arm 110, so that the stepping force required for the driver to depress the pedal pad 111a increases, and on the contrary, when the driver releases the pedal pad 111a, the first frictional force acts in the opposite direction (i.e., a second direction) to that when the driver depresses the pedal pad 111a, so that the stepping force required for the driver decreases.

In other words, due to the frictional force that resists against the movement of the pedal arm 110 in either direction, the torque necessary to maintain a constant rotational speed of the pedal arm 110 (i.e., without causing angular acceleration) against the reaction force generated by the pedal reaction force generating unit 130 becomes greater for the direction of depression of the pedal arm 110 than for the direction of releasing it.

In addition, in the exemplary embodiment of the present disclosure, an example where the first friction member 140 abuts one side of the proximal end 112 of the pedal arm 110 to generate the first frictional force is described, but the present disclosure is not limited thereto. Instead, the first friction member 140 may be in contact with a friction pad separately provided for contacting the first friction member 140 on one side of the proximal end 112 of the pedal arm 110 to generate a first frictional force of an appropriate magnitude.

Meanwhile, in the pressing member 120, partition walls 123 may be formed on both sides of the first friction member 140 in the direction toward the first axis Ax1, respectively, and the partition walls 123 may prevent the proximal end 112 of the pedal arm 110 from moving in the direction toward the first axis Ax1.

Figure 11:
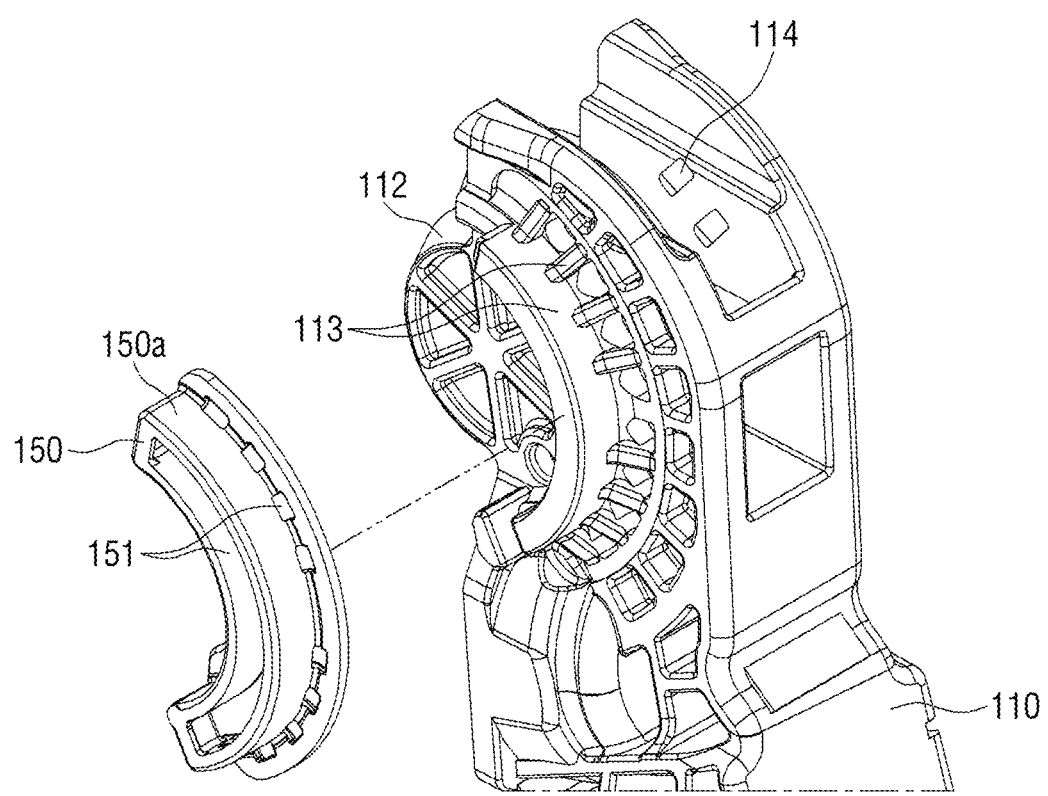
FIG. 11 is a perspective view illustrating a second friction member according to an exemplary embodiment of the present disclosure.
Figure 12:
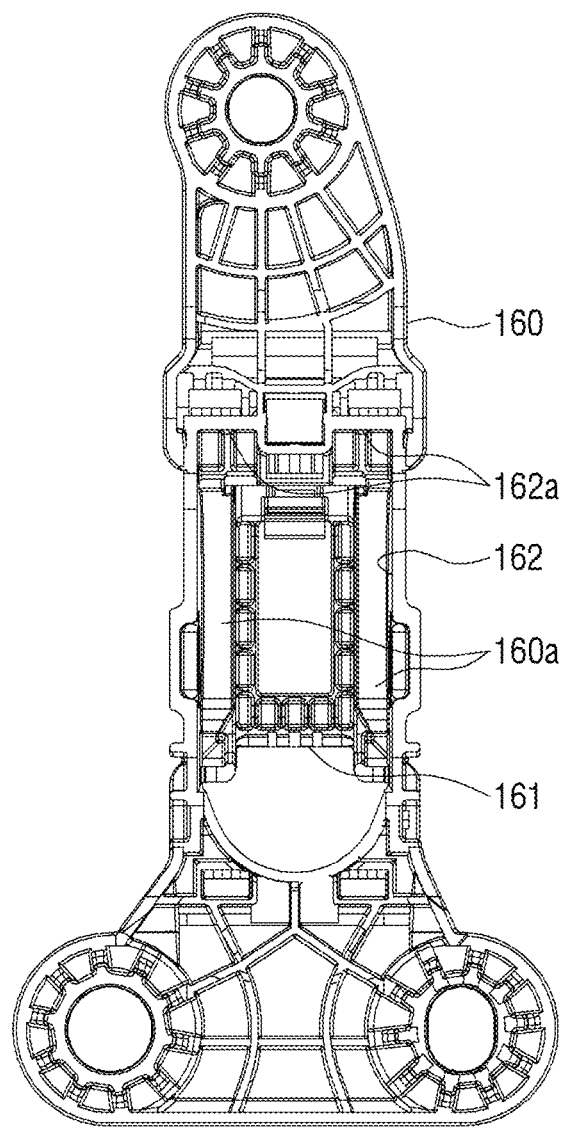
FIG. 12 is a rear view showing a pedal housing according to an exemplary embodiment of the present disclosure.
Figure 13:
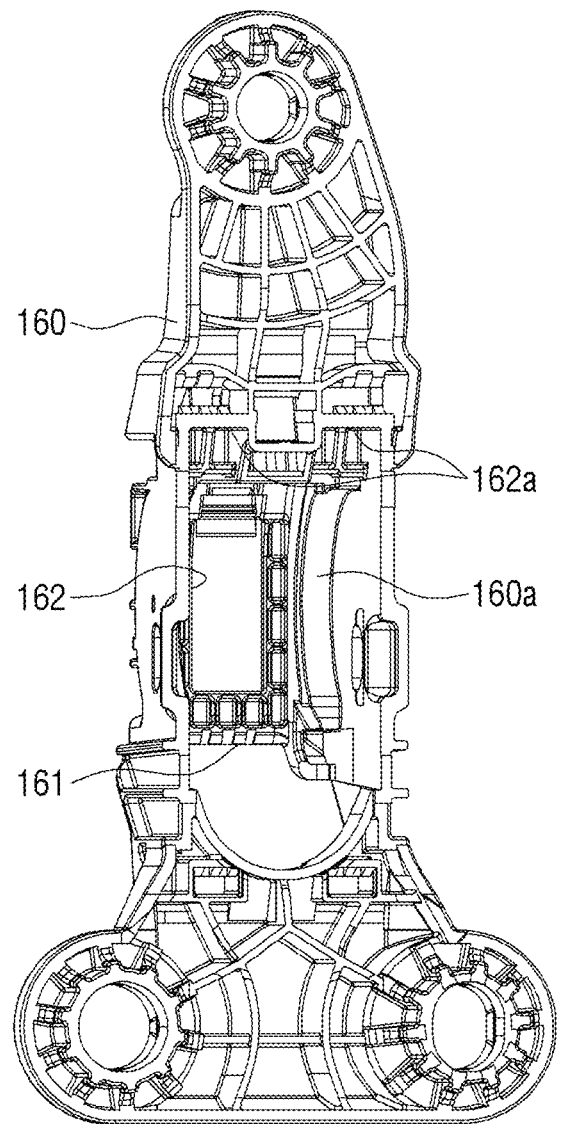
FIG. 13 is a perspective view illustrating a pedal housing according to an exemplary embodiment of the present disclosure.

FIG. 11 is a perspective view showing a second friction member according to an exemplary embodiment of the present disclosure, FIG. 12 is a rear view showing a pedal housing according to an exemplary embodiment of the present disclosure, and FIG. 13 is a perspective view showing the pedal housing according to an exemplary embodiment of the present disclosure.

Referring to FIGS. 11 to 13, the second friction member 150 may be coupled to the proximal end 112 of the pedal arm 110 to abut the inner surface 160a of the pedal housing 160 and generate a second frictional force. The second friction member 150 may be disposed in a direction facing the first friction member 140 with respect to the first axis Ax1, and the force applied to the inner surface 160a of the pedal housing 160 by the second friction member 150 may be varied depending on the force applied to one side of the proximal end 112 of the pedal arm 110 by the first friction member 140.

In particular, the contact surface 150a, in which the second friction member 150 contacts the inner surface 160a of the pedal housing 160, may have a shape corresponding to the inner surface 160a of the pedal housing 160, and in the exemplary embodiment of the present disclosure, since the inner surface 160a of the pedal housing 160 has a curved shape having a predetermined radius with respect to the first axis Ax1, the contact surface 150a of the second friction member 150 may also have a curved shape corresponding to the shape of the inner surface 160a of the pedal housing 160. This configuration may enable the rotation of the pedal arm 110, while generating a second frictional force between the second friction member 150 and the inner surface 160a of the pedal housing 160, similarly as the above-described first friction member 140.

Figure 14:
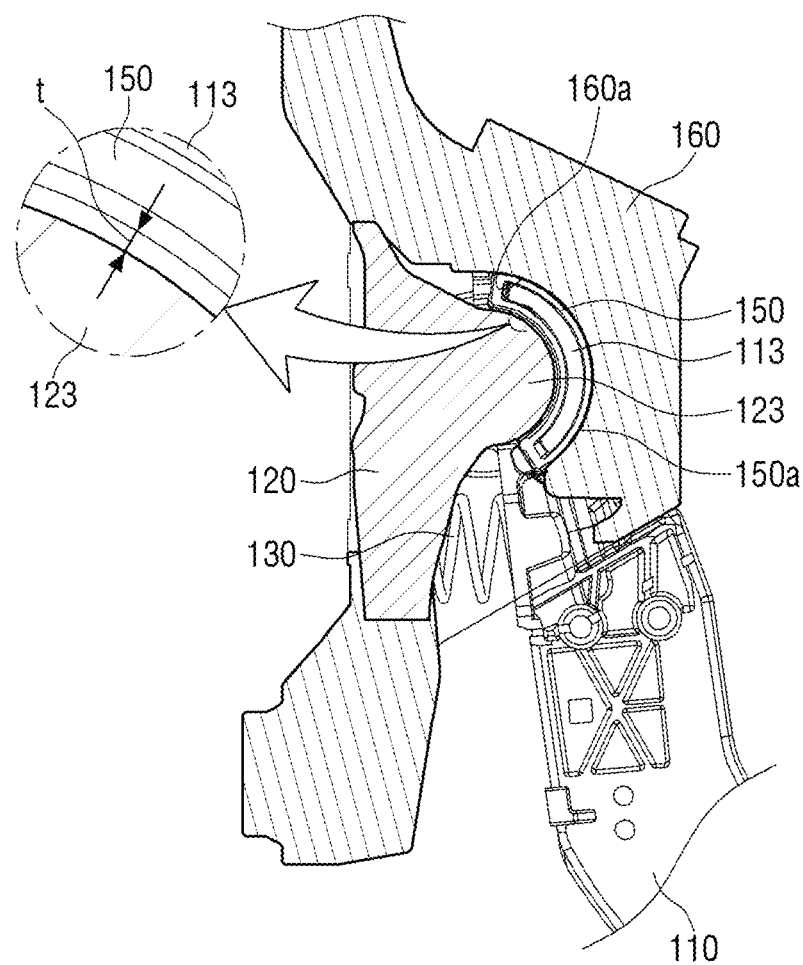
FIG. 14 is a cross-sectional view showing a pressing member and a second friction member according to an exemplary embodiment of the present disclosure.

On the other hand, the pressing member 120 may be spaced apart from the second friction member 150 by a predetermined gap (t) as shown in FIG. 14, and in the exemplary embodiment of the present disclosure, the description that the pressing member 120 may be spaced apart from the second friction member 150 by the predetermined gap (t) may be understood that the portion of the pressing member 120 closest to the second friction member 150, that is, the partition walls 123 formed on both sides of the first friction member 140 in the direction toward the first axis Ax1 are spaced apart from the second friction member 150 by a predetermined gap (t).

Due to the configuration that the pressing member 120 is spaced apart from the second friction member 150 by a predetermined gap (t), a frictional force of an appropriate magnitude may be more easily generated when the second friction member 150 receives the force applied to one side of the proximal end 112 of the pedal arm 110 by the first friction member 140 as well as the force directly transmitted by the pressing member 120.

In other words, in the exemplary embodiment of the present disclosure, according to the force applied to one side of the proximal end 112 of the pedal arm 110 by the first friction member 140, the magnitude of the first frictional force generated between the first friction member 140 and one side of the proximal end 112 of the pedal arm 110 and the magnitude of the second frictional force generated between the second friction member 150 and the inner surface 160a of the pedal housing 160 may be varied. With this configuration, the magnitude of the first frictional force and the magnitude of the second frictional force may be adjusted more easily than for a configuration where a force is directly applied to the second friction member 150 by the pressing member 120.

Figure 15:
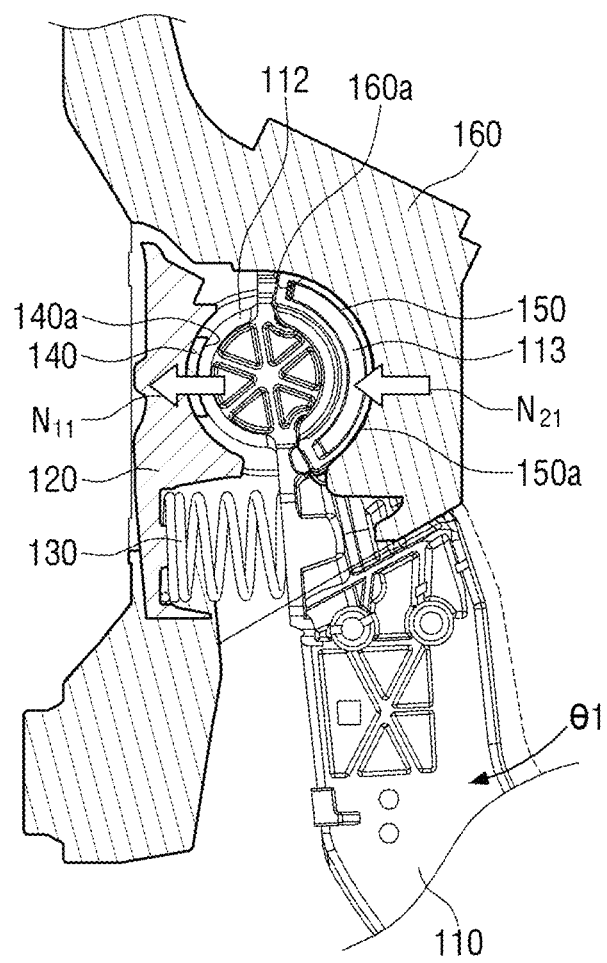
FIGS. 15 and 16 are schematic diagrams showing a normal force generated at the proximal end of the pedal arm in contact with the first friction member and a normal force generated at the inner surface of the pedal housing in contact with the second friction member based on the rotation angle of the pedal arm according to an exemplary embodiment of the present disclosure.
Figure 16:
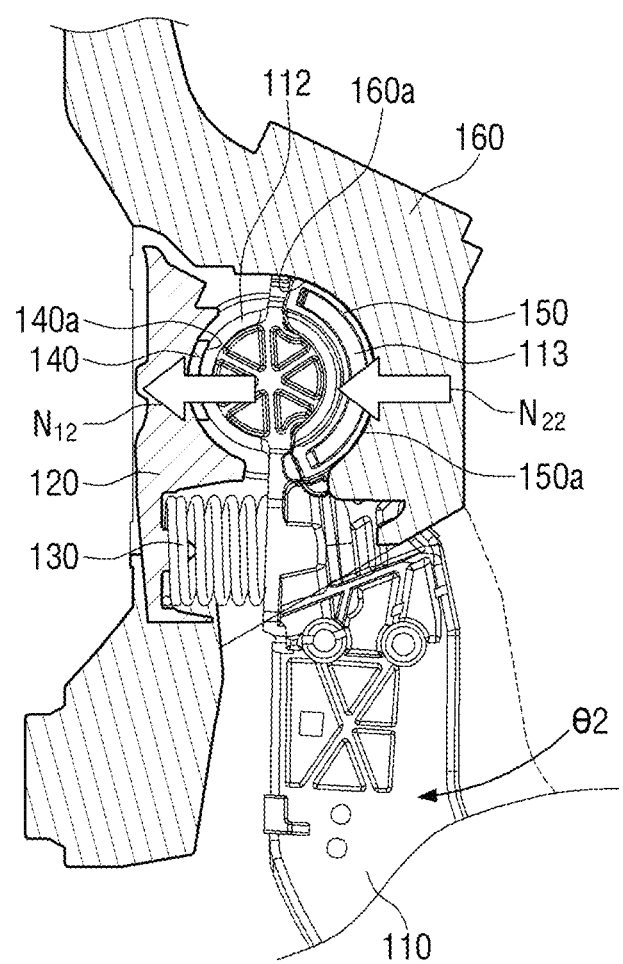

FIGS. 15 and 16 are schematic diagrams showing a normal force generated at the proximal end 112 of the pedal arm 110 in contact with the first friction member 140 and a normal force generated at the inner surface 160a of the pedal housing 160 in contact with the second friction member 150 based on the rotation angle of the pedal arm 110 according to an exemplary embodiment of the present disclosure.

Referring to FIGS. 15 and 16, in the second friction member 150 according to the exemplary embodiment of the present disclosure, at least one fixing groove 151, into which at least one fixing protrusion 113 formed on the proximal end 112 of the pedal arm 110 is inserted, may be formed, thereby allowing a rotation with respect to the first axis Ax1 integrally with the pedal arm 110 when the pedal arm 110 rotates to generate a second frictional force.

Accordingly, when the driver depresses the pedal pad 111a and the rotation angle of the pedal arm 110 increases, the magnitude of the force applied to one side of the proximal end 112 of the pedal arm 110 by the first friction member 140 increases, and in turn, the magnitude of the force applied to the inner surface 160a of the pedal housing 160 by the second friction member 150 also increases. Thus, as the magnitude of the normal force generated at the inner surface 160a of the pedal housing 160 in contact with the second friction member 150 increases, and the magnitude of the second frictional force increases.

Like the first frictional force, the second frictional force acts in the first direction opposite to the direction of the actuating force that acts on the pedal arm 110 when the driver depresses the pedal pad 111a, so that the stepping force required for the driver to depress the pedal pad 111a becomes greater. Conversely, when the driver releases the pedal pad 111a, the second frictional force acts in the second direction opposite to that when the driver depresses the pedal pad 111a so that the reaction force by the pedal pad 111a exerted onto the driver's foot becomes relatively less.

In the exemplary embodiment of the present disclosure, an example where the second friction member 150 is in direct contact with the inner surface 160a of the pedal housing 160 is described, but the present disclosure is not limited thereto. In some embodiments, the second frictional force of an appropriate magnitude may be generated by the second friction member 150 that abuts a friction pad provided in the pedal housing 160 for contacting the second friction member 150, the friction pad being separately provided from the pedal housing 160.

As described above, in the exemplary embodiment of the present disclosure, due to the configuration that generates hysteresis via both the first friction member 140 and the second friction member 150, compared to using a single friction member, it is easier to generate a pedal reaction force of an appropriate magnitude even in a limited installation space.

In particular, in the case of using a single friction member, there is a limit in increasing the size of the friction member in order to increase the magnitude of the frictional force due to the limitation of the installation space, whereas in the exemplary embodiment of the present disclosure, since the areas from which the frictional force is generated by the first friction member 140 and the second friction member 150 can be increased, it is possible to generate a frictional force of a sufficient magnitude within a limited installation space as well as to adjust the magnitude of the frictional force more precisely by adjusting the size of the first friction member 140 and the second friction member 150.

In addition, in the exemplary embodiment of the present disclosure, since the first friction member 140 and the second friction member 150 may serve to fix the position of the proximal end 112 of the pedal arm 110 as well as to generate hysteresis, a separate structure for fixing the position of the proximal end 112 of the pedal arm 110 may be omitted so that the structure can be simplified.

That is, the first friction member 140 and the second friction member 150 may be disposed to face each other with respect to the first axis Ax1, and in this case, the first friction member 140 may support one side of the proximal end 112 of the pedal arm 110 based on the first axis Ax1, and the second friction member 150 may support the other side of the proximal end 112 of the pedal arm 110 with respect to the first axis Ax1 by the inner surface 160a of the pedal housing 160. Thus, the proximal end 112 of the pedal arm 110 may be prevented from moving noticeably in a radial direction with respect to the first axis Ax1, so that the position of the proximal end 112 of the pedal arm 110 can be fixed substantially.

The frictional force generated by the above-described first friction member 140 and second friction member 150 may be obtained by Equation 1 below.

$$f = \mu \times N \qquad \text{[Equation 1]}$$

In Equation 1, f denotes a frictional force, μ denotes a friction coefficient, and N denotes a normal force.

When the normal force generated at one side of the proximal end 112 of the pedal arm 110 due to the force applied by the first friction member 140 is $N_1$, the frictional force $f_1$ generated by the first friction member 140 becomes $f_1 = \mu_1 \times N_1$. Similarly, when the normal force generated at the inner surface 160a of the pedal arm 110 due to the force applied by the second friction member 150 is $N_2$, the frictional force $f_2$ generated by the second friction member 150 becomes $f_2 = \mu_2 \times N_2$.

Here, $\mu_1$ and $\mu_2$ are constant as they generally depend on the material, and as the rotation angle of the pedal arm 110 increases as the driver depresses the pedal pad 111a more deeply, $N_1$ and $N_2$ increase, so that $f_1$ and $f_2$ increase as a result.

As shown in FIGS. 15 and 16, compared to the normal force $N_{11}$ generated at one side of the proximal end 112 of the pedal arm 110 due to the force applied by the first friction member 140 when the rotation angle of the pedal arm 110 is a first angle θ1, the normal force $N_{12}$ generated at one side of the proximal end 112 of the pedal arm 110 when the rotation angle of the pedal arm 110 is a second angle θ2 that is greater than the first angle θ1 becomes greater, and thus the magnitude of the first frictional force may be increased. Similarly, compared to the normal force $N_{21}$ generated at the inner surface 160a 112 of the pedal housing 160 due to the force applied by the second friction member 150 when the rotation angle of the pedal arm 110 is a first angle θ1, the normal force $N_{22}$ generated at the inner surface 160a of the pedal housing 160 when the rotation angle of the pedal arm 110 is a second angle θ2 that is greater than the first angle θ1 becomes greater as well, and thus the magnitude of the second frictional force is also increased.

Figure 17:
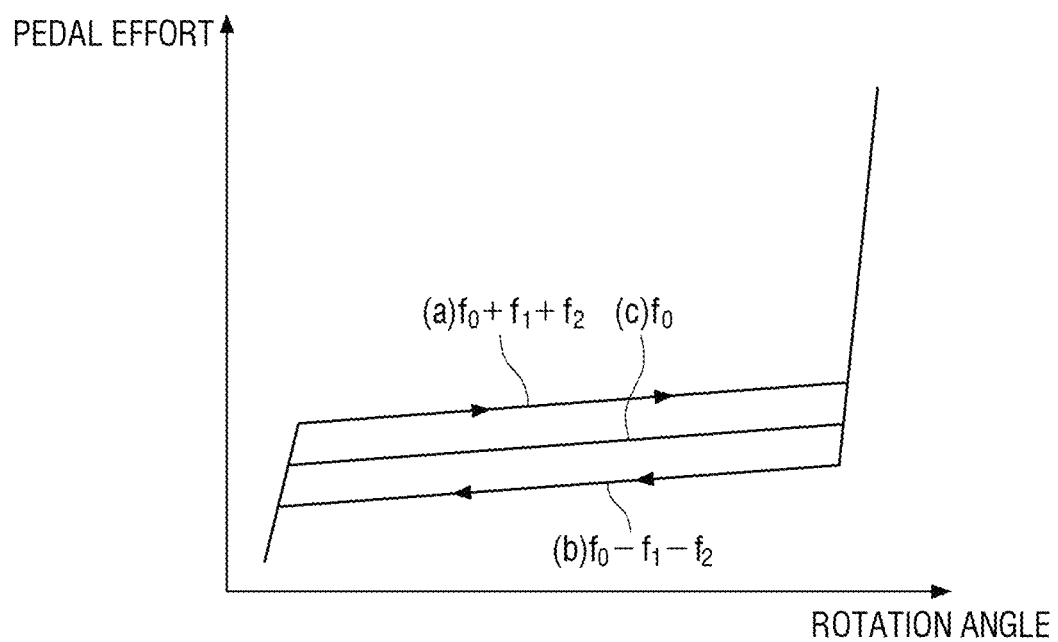
FIG. 17 is a schematic diagram illustrating a pedal reaction force generated by a pedal apparatus for a vehicle according to an exemplary embodiment of the present disclosure.

FIG. 17 is a schematic diagram illustrating a pedal reaction force generated by a pedal apparatus for a vehicle according to an exemplary embodiment of the present disclosure. Referring to FIG. 17, when the driver depresses the pedal pad 111a, the total force that the driver is required to exert to rotate the pedal arm 110 in the depressing direction may be obtained by adding the pedal reaction force $f_0$ generated by the pedal reaction force generating unit 130, the frictional force $f_1$ by the first friction member 150, and the frictional force $f_2$ by the second friction member 150, as shown by curve (a) in FIG. 17, which increases as the rotation angle of the pedal arm 110 increases. On the other hand, when the driver releases the pedal pad 111a, the total force that the driver is required to exert to allow the pedal arm 110 to rotate in the returning direction, without an angular acceleration toward the returning direction, may be reduced. Compared to the total force required for the driver to depress the pedal pad 111a, a part of the pedal reaction force $f_0$ generated by the pedal reaction force generating unit 130 is offset by the frictional force $f_1$ of the first friction member 140 and the frictional force $f_2$ of the second friction member 150, as shown by curve (b) in FIG. 17. Therefore, the driver may release the pedal pad 111a against a smaller reaction force, causing less fatigue when operating the pedal.

Curve (c) of FIG. 17 shows the pedal reaction force against the driver when no frictional force is provided by the first friction member 140 and the second friction member 150, and in this case, since only the pedal reaction force by the pedal reaction force generating unit 130 is applied, equal pedal reaction forces are generated either when the driver depresses or releases the pedal pad 111a, which may cause more fatigue to the driver.

Meanwhile, the pedal apparatus 100 for a vehicle according to an exemplary embodiment of the present disclosure may further include a position detecting unit 170 that detects the position of the pedal arm 110 and enables adjustment of the amount of combustion, or the like. The position detecting unit 170 may detect a change in magnetic force based on the position of the magnet 114 whose position is changed according to the rotation of the pedal arm 110.

In the exemplary embodiment of the present disclosure, an example where the magnet 114 is disposed near the first axis Ax1 of the pedal arm 110 so that the position is changed when the pedal arm 110 rotates is described. However, the present disclosure is not limited thereto, and the magnet 114 may be provided at various positions, in which the position may be changed along a straight line, a curved line, or a combination thereof, based on the rotation of the pedal arm 110.

Figure 18:
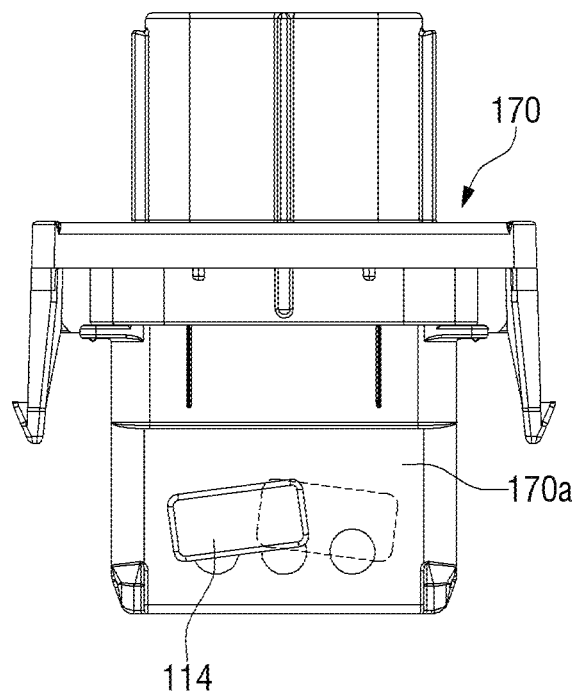
FIG. 18 is a schematic diagram illustrating a magnet whose position is changed with respect to a position detecting unit when the pedal arm is rotated according to an exemplary embodiment of the present disclosure.
Figure 19:
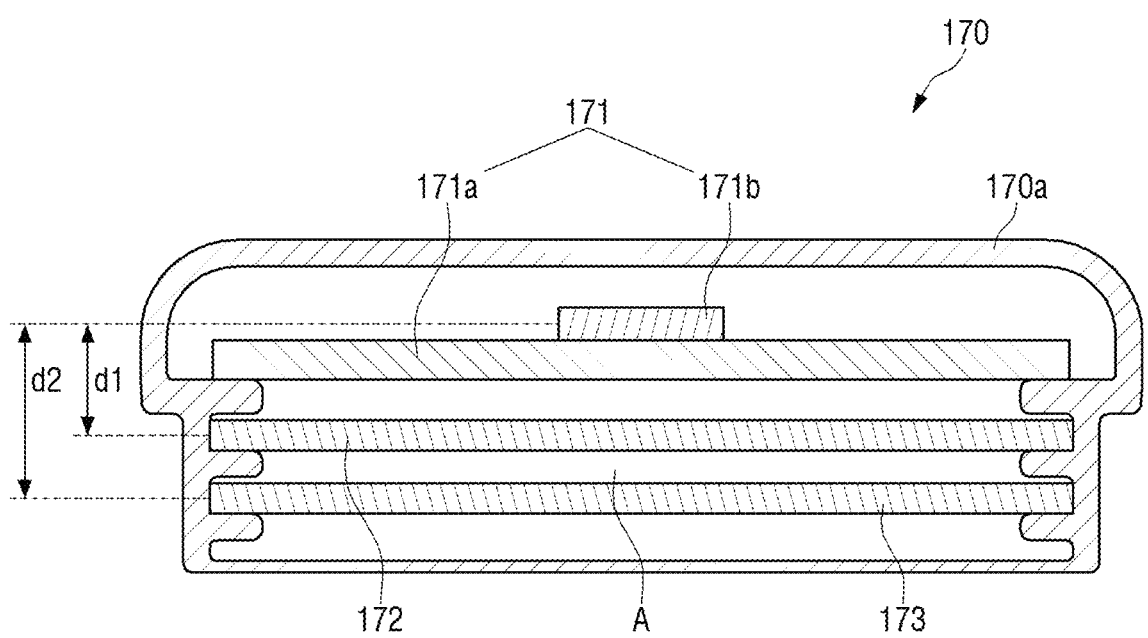
FIG. 19 is a cross-sectional view showing a position detecting unit according to an exemplary embodiment of the present disclosure.
Figure 20:
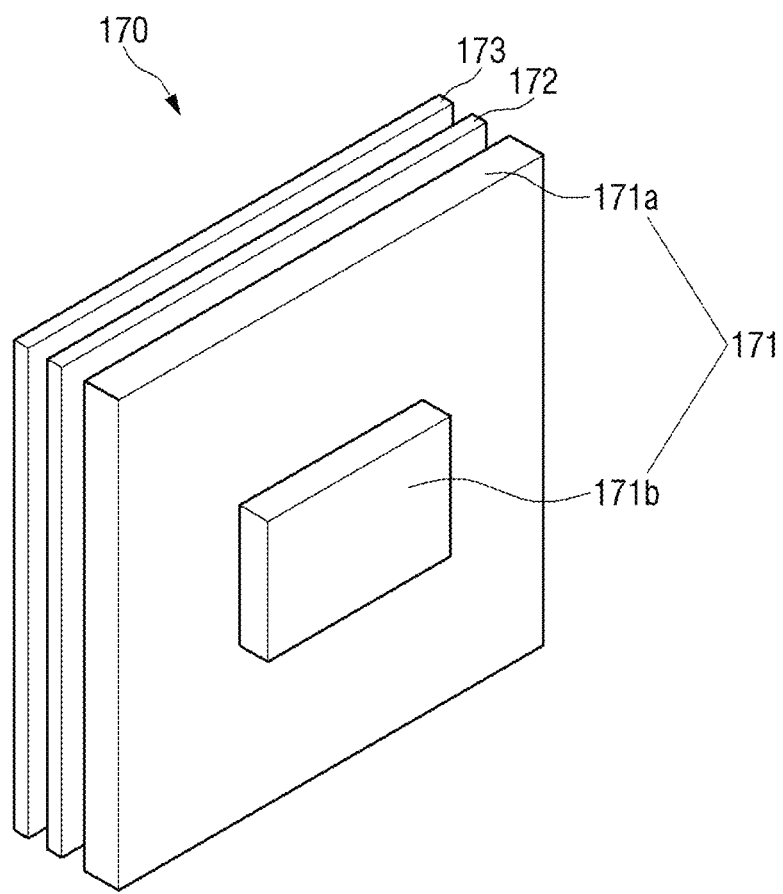
FIG. 20 is a perspective view illustrating a position detecting unit according to an exemplary embodiment of the present disclosure.

FIG. 18 is a schematic diagram illustrating a magnet 114 whose position is changed with respect to the position detecting unit 170 when the pedal arm 110 is rotated according to an exemplary embodiment of the present disclosure, FIG. 19 is a cross-sectional view illustrating the position detecting unit 170 according to an exemplary embodiment of the present disclosure, and FIG. 20 is a perspective view of a position detecting unit 170 according to an exemplary embodiment of the present disclosure. FIG. 18 shows an example with the housing 170a omitted for convenience of description.

Referring to FIGS. 18 to 20, the position detecting unit 170 according to an exemplary embodiment of the present disclosure may be disposed to have different gaps from the sensor unit 171 and the magnet 114, and may include a plurality of shielding units 172 and 173 to block the magnetic field generated by each of the magnet 114 and the external magnetic field generating source. The sensor unit 171 and the plurality of shielding units 172 and 173 may be accommodated in the housing 170a and may be disposed adjacent to the magnet 114 provided at the proximal end 112 of the pedal arm 110.

The sensor unit 171 may include at least one sensor 171b installed on a substrate 171a, and the at least one sensor 171b may include a plurality of sensors to prevent or mitigate detection errors. For example, when the at least one sensor 171b includes a plurality of sensors, the plurality of sensors may output detection signals having different amplitudes based on the position of the magnet 114. For example, when the amplitudes between the detection signals output from the plurality of sensors are within a certain range, the ECU of the vehicle may control the combustion amount based on a relatively large detection signal. When the amplitudes are outside of the certain range, the ECU may control the combustion amount based on a relatively small detection signal.

Figure 21:
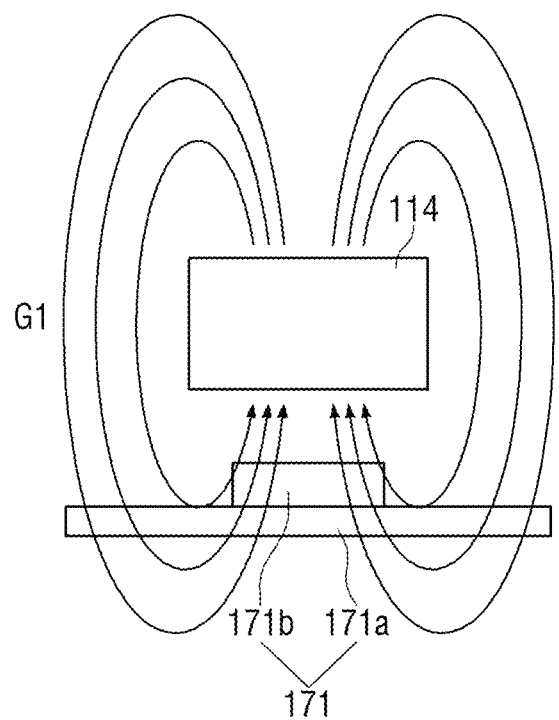
FIG. 21 is a schematic diagram showing a magnetic force line formed by a magnet according to an exemplary embodiment of the present disclosure.

At least one sensor 171b may be formed so that, when there is no influence in the vehicle pedal apparatus 100 of the present disclosure by an external magnetic field from an external source, as shown in FIG. 21, the magnetic force line G1 is emitted from the magnet 114 and converged back to the magnet 114, so that it can be detected by at least one sensor 171b. However, when an external magnetic field by an external source exists, since the magnetic field of the magnet 114 is affected by the external magnetic field, there is a possibility that abnormal detection may be made. Herein, the external source means an external object that can generate a magnetic field to the extent that interference with the magnetic field generated by the magnet 114 may occur. Such an external object may include a magnetic object disposed in the vehicle or a motor used as a power source of an electric vehicle.

In an exemplary embodiment of the present disclosure, due to a plurality of shielding units 172 and 173 disposed with different gaps from the magnet 114, the intensity of the magnetic field of the magnet 114 detected by the at least one sensor 171b may not be affected by the external magnetic field, since the magnetic field of the magnet 114 and the external magnetic field are blocked from each other, no interference may occur between the magnetic field of the magnet 114 and the external magnetic field.

In an exemplary embodiment of the present disclosure, although an example is provided for a case where the plurality of shield units 172 and 173 are disposed in the opposite direction of the magnet 114 with respect to the substrate 171a so that mutual interference may be prevented between the magnetic field of the magnet 114 and the external magnetic field, the direction in which the plurality of shielding units 172 and 173 are disposed may vary depending on the direction of the external magnetic field.

The plurality of shielding units 172 and 173 may be made of a material having high magnetic permeability and may serve to induce a magnetic force line that forms a magnetic field, and in the following exemplary embodiment of the present disclosure, the plurality of shielding units 172 and 173 will be referred to as the first shielding unit 172 disposed to have a first gap d1 from the magnet 114 and a second shielding unit 173 disposed to have a second gap d2 greater than the first gap d1 from the magnet 114. The first shielding unit 172 may prevent the magnetic field formed by the magnet 114 from affecting the external magnetic field, and the second shielding unit 173 may prevent the external magnetic field from affecting the magnetic field formed by the magnet 114.

The first shielding unit 172 and the second shielding unit 173 may be spaced apart from each other by a predetermined gap. This is to form an air gap A between the first shielding unit 172 and the second shielding unit 173 to reduce the space required, compared to the case in which the first shielding unit 172 and the second shielding unit 173 are integrally formed. When the first shielding unit 172 and the second shielding unit 173 are integrally formed so that no air gap A is formed between the first shielding unit 172 and the second shielding unit 173, the thickness needs to be relatively increased in order to prevent mutual interference between the magnetic field formed by the magnet 114 and the external magnetic field. However, in the exemplary embodiment of the present disclosure, since the first shielding unit 172 and the second shielding unit 173 are spaced apart by a predetermined gap to form an air gap A therebetween, the total thickness, which is a summation of thicknesses of the first shielding unit 172, the thickness of the second shielding unit 173, and the thickness of the air gap A, may be reduced.

The size of the air gap A formed between the first shielding unit 172 and the second shielding unit 173 may vary depending on the thicknesses of the first shielding unit 172 and the second shielding unit 173. When the thicknesses of the first shielding unit 172 and the second shielding unit 173 are greater, the possibility that the magnetic force line passes through the first shielding unit 172 and the second shielding unit 173 may be lowered, so that the air gap A between the first shielding unit 172 and the second shielding unit 173 can be relatively small.

Meanwhile, in the above-described example, the first shielding unit 172 and the second shielding unit 173 are respectively slidingly coupled to the housing 170a. However, the present disclosure is not limited thereto. One or both of the first shielding unit 172 and the second shielding unit 173 may be integrally formed with the housing 170a via insert injection for housing 170a, and when the housing 170a is made of a non-conductive resin material, the first shielding unit 172 may prevent the magnetic field formed by the magnet 114 from affecting the external magnetic field, and the second shielding unit 173 may block the external magnetic field so as not to affect the magnetic field formed by the magnet 114, similar to the case where the air gap A is formed between the unit 172 and the second shielding unit 173. In addition, between the first shielding unit 172 and the second shielding unit 173, a separate member made of a non-conductive material having a thickness corresponding to the spacing gap between the first shielding unit 172 and the second shielding unit 173 may be disposed in addition to the housing 170a.

Figure 22:
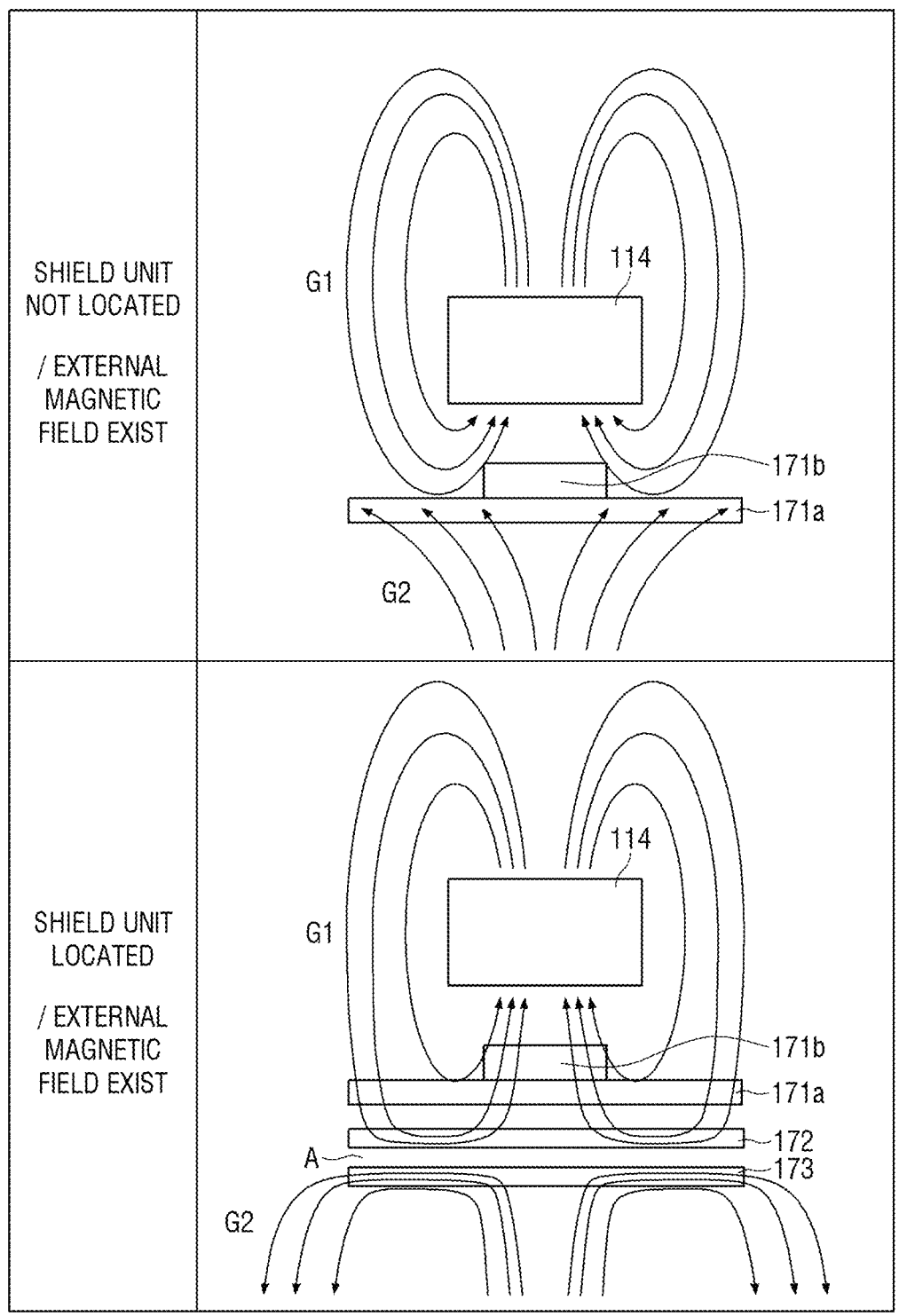
FIG. 22 is a schematic diagram showing a magnetic force line formed by a magnet and an external magnetic field generating source according to an exemplary embodiment of the present disclosure.

FIG. 22 is a schematic diagram showing magnetic force lines formed by a magnet and an external magnetic field generating source according to an exemplary embodiment of the present disclosure. Referring to FIG. 22, when the plurality of shielding units 172 and 173 are not provided, it can be seen that the magnetic force line G1 emitted from the magnet 114 is affected by the magnetic force line G2 of the external magnetic field, and moved in the direction toward the magnet 114 from the at least one sensor 171b. In this case, not only the magnetic field of the magnet 114 but also the external magnetic field is detected by at least one sensor 131 so that an abnormal detection can be made, which may cause inaccurate detection of the position of the pedal arm 110.

In the exemplary embodiment of the present disclosure, however, the first shielding unit 172 and the second shielding unit 173 may be respectively disposed to have different gaps from the magnet 114 so as to prevent erroneous detection of the position of the pedal arm 110 due to an external magnetic field, and in this case, a part of the magnetic force line G1 emitted from the magnet 114 may be formed to converge on the magnet 114 along the first shielding unit 172, and similarly, a part of the magnetic force line G2 emitted from an external magnetic field generating unit may be formed to converge to an external magnetic field generating source along the second shielding unit 173, so that mutual interference between the magnetic field by the magnet 114 and the external magnetic field can be prevented.

While the present disclosure has been particularly shown and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

What is claimed is:

1. A pedal apparatus for a vehicle comprising:
   a pedal arm coupled to a pedal housing such that the pedal arm is rotatable with respect to a first axis by an actuating force applied to a pedal pad disposed at a distal end of the pedal arm;
   a pressing member for applying a force to a proximal end of the pedal arm in response to the pedal arm being rotated;
   a pedal reaction force generating unit disposed between the pedal arm and the pressing member to generate a pedal reaction force corresponding to the actuating force;
   a first friction member disposed at the pressing member to contact the proximal end of the pedal arm; and
   a second friction member disposed at the proximal end of the pedal arm to contact an inner surface of the pedal housing,
   wherein the first friction member and the second friction member are disposed to face each other with respect to the first axis.

2. The pedal apparatus of claim 1, wherein the pressing member is spaced apart from the second friction member.

3. The pedal apparatus of claim 1, wherein a contact surface of the first friction member in contact with the proximal end of the pedal arm has a shape corresponding to a shape of the proximal end of the pedal arm, and
   wherein the contact surface of the first friction member has a curved shape having a predetermined radius with respect to the first axis.

4. The pedal apparatus of claim 1, wherein one of the pressing member or the first friction member includes at least one mounting protrusion, and the other of the pressing member or the first friction member includes at least one mounting groove, into which the at least one mounting protrusion is inserted.

5. The pedal apparatus of claim 1, wherein a contact surface of the second friction member in contact with the inner surface of the pedal housing has a shape corresponding to the inner surface of the pedal housing, and
   wherein the inner surface of the pedal housing has a curved shape having a predetermined radius with respect to the first axis.

6. The pedal apparatus of claim 1, wherein the pressing member is accommodated in the pedal housing through an opening formed in the pedal housing, and
   wherein the pedal apparatus further comprises a cover coupled to the pedal housing to shield the opening with the pressing member accommodated therein.

7. The pedal apparatus of claim 6, wherein the cover comprises at least one coupling protrusion that is inserted into and coupled to at least one coupling groove formed near the opening.

8. The pedal apparatus of claim 6, wherein the cover further comprises a guide unit formed to surround an outer surface of the pedal housing so that a coupling position of the cover is aligned.

9. The pedal apparatus of claim 1, wherein a force applied to the pedal housing by the second friction member increases as a force applied to the proximal end of the pedal arm by the first friction member increases.

10. The pedal apparatus of claim 1, wherein a frictional force generated between the first friction member and the proximal end of the pedal arm has a magnitude corresponding to a normal force generated from the proximal end of the pedal arm according to a force applied to the proximal end of the pedal arm by the first friction member.

11. The pedal apparatus of claim 1, wherein a magnitude of a frictional force generated between the first friction member and the proximal end of the pedal arm varies depending on a magnitude of the actuating force transmitted through the pressing member.

12. The pedal apparatus of claim 1, wherein a frictional force generated between the second friction member and the pedal housing has a magnitude corresponding to a normal force generated from the inner surface of the pedal housing according to a force applied to the inner surface of the pedal housing by the second friction member.

13. The pedal apparatus of claim 1, wherein a magnitude of a frictional force generated between the second friction member and the pedal housing varies depending on a magnitude of a force applied to the proximal end of the pedal arm by the first friction member.

14. The pedal apparatus of claim 1, wherein, in response to a driver depressing the pedal pad, a frictional force generated between the first friction member and the proximal end of the pedal arm and a frictional force generated between the second friction member and the pedal housing act in a first direction opposite to a direction of the actuating force acting on the pedal arm, and
   wherein, in response to the driver releasing the pedal pad, the frictional force generated between the first friction member and the proximal end of the pedal arm and the frictional force generated between the second friction member and the pedal housing act in a second direction opposite to the first direction.

15. A pedal apparatus for a vehicle comprising:
   a pedal arm coupled to a pedal housing such that the pedal arm is rotatable with respect to a first axis by an actuating force applied to a pedal pad disposed at a distal end of the pedal arm;
   a pressing member for applying a force to a proximal end of the pedal arm in response to the pedal arm being rotated;
   a pedal reaction force generating unit disposed between the pedal arm and the pressing member to generate a pedal reaction force corresponding to the actuating force;
   a first friction member disposed at the pressing member to generate a first frictional force on the proximal end of the pedal arm; and
   a second friction member disposed at the proximal end of the pedal arm to generate a second frictional force on an inner surface of the pedal housing,
   wherein the first friction member and the second friction member are disposed to face each other with respect to the first axis.

16. The pedal apparatus of claim 15, wherein the pressing member is spaced apart from the second friction member.

17. The pedal apparatus of claim 15, wherein one of the pressing member or the first friction member includes at least one mounting protrusion, and the other of the pressing member or the first friction member includes at least one mounting groove, into which the at least one mounting protrusion is inserted.

18. A pedal apparatus for a vehicle comprising:
   a pedal arm coupled to a pedal housing such that the pedal arm is rotatable with respect to a first axis by an actuating force applied to a pedal pad disposed at a distal end of the pedal arm;

a pressing member for applying a force to a proximal end of the pedal arm in response to the pedal arm being rotated;

a pedal reaction force generating unit disposed between the pedal arm and the pressing member to generate a pedal reaction force corresponding to the actuating force;

a first friction member disposed at the pressing member to contact the proximal end of the pedal arm; and a second friction member disposed at the proximal end of the pedal arm to contact an inner surface of the pedal housing, wherein the pressing member is installed in the pedal housing to be rotatable with respect to a second axis.

19. The pedal apparatus of claim 18, wherein the second axis is disposed parallel to the first axis.

* * * * *